May 27, 1941.  F. W. HOCH  2,243,674

METHOD AND MEANS FOR TESTING INK REQUIREMENTS

Filed July 27, 1939    2 Sheets-Sheet 1

INVENTOR.
Fred W. Hoch
BY C. P. Goepel
his ATTORNEY.

Patented May 27, 1941

2,243,674

UNITED STATES PATENT OFFICE 2,243,674

METHOD AND MEANS FOR TESTING INK REQUIREMENTS

Fred W. Hoch, Forest Hills, N. Y.

Application July 27, 1939, Serial No. 286,763

2 Claims. (Cl. 73—51)

This invention relates to my invention described and claimed in U. S. Letters Patent No. 2,167,652, in which a method was disclosed for ascertaining the coverage of printing ink, which consists in taking a sample of the ink, applying the ink without pressure in separated film layers, each of different and determinable thickness, on a trial sheet, and selecting the desired thickness according to color coverage and determining the square inch coverage of the selected thickness of ink by dividing the amount of film thickness into a unit of cubical contents of the ink, as more fully described and claimed in said patent.

The present invention has for its object to provide a convenient means to carry out said process, and also has for its object to provide an improved label process whereupon the user of the ink can at once determine the ink film thickness corresponding to a certain area in square inches, the number of hours to dry, the amount in the can in cubical inches, etc., said label giving also the actual thickness, and hence color at said thickness.

The invention consists of the combination upon a visible surface of a plurality of ink markings of different thicknesses with attached indications of said thicknesses, together with the time required for drying the same, and indications corresponding to area in square inches covered by ink in any of the film thicknesses indicated, and, further, indications as to the quantity and color or sales number, and cubic contents, and with means whereby the indications on the label may be readily tested. Such means may be either part of the container of the ink to which the just mentioned indications have been applied, or they may be separate therefrom.

The invention will be further described, embodiments thereof shown in the drawings, and the invention will be further pointed out in the claims.

Figure 3:
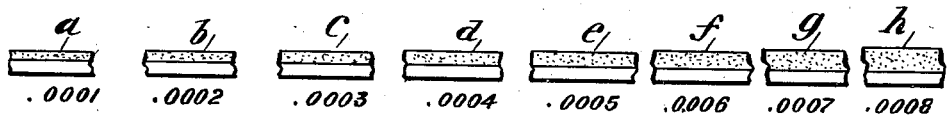
Figure 3 is a drawing showing a plurality of different gauges of ink applied to different test papers.
Figure 7:
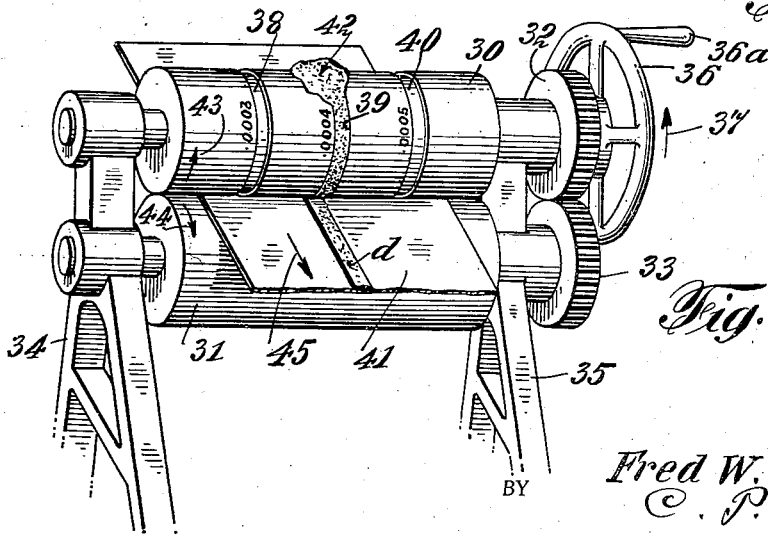
Figure 8:
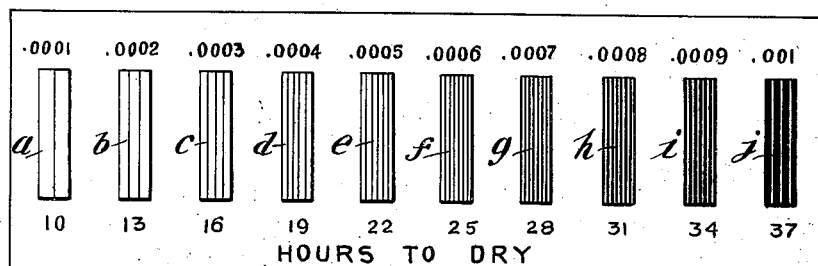

Figure 7 is a perspective of still another embodiment in the form of a grooved roller, in order to apply gauges of ink to paper strips or samples, only those grooves being shown which, however, are representative of a plurality or a series such as shown in Figure 3, if carried higher to .001 or above; and Figure 8 is a plan view of the exterior of either the square shaped container or the cylindrically shaped container, or may be a flat label to be applied thereto.

Similar characters of reference indicate corresponding views.

Referring to drawings, and more particularly to Figure 8, there is shown a plurality or series of strokes of ink each of a different gauge or depth, preferably from .0001 in. to .001 in., and of the same basic color though of different shades. Preferably, due to the variant of thicknesses, the time for drying varies according to the thicknesses. For a given quantity of color, say 10 lb., which equals 40 cu. in., as explained in the aforesaid patent, a certain film thickness corresponds to a certain area in square inches of coverage, so, for instance, for an ink or paint coverage of .0001 in. in film thickness, an area coverage of 400,000 square inches is obtained, and of the shade of color as indicated in the plurality of applied colors, namely, the shade corresponding to that associated with .0001 in. At this shade of color and at this film thickness, the area covered will be 400,000 square inches of .0001 thickness and the time to dry about 10 hours. The film thicknesses in height or gauge of ink being given as associated with the color-shade bands portraying the true color shade, as shown in Figure 8; the corresponding area in square inches as representative of the coverage of the ink at any certain film thickness, could be associated with the colored bands, instead of being shown in a separate table, in which columns of film thickness and areas in square inches as coverage, are shown vertically side by side.

Figure 1:
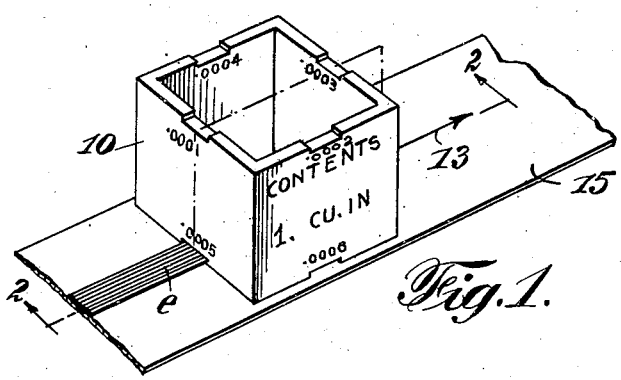
Figure 1 is a perspective view of the preferred means for gauging the ink and spreading it upon a test paper.
Figure 6:
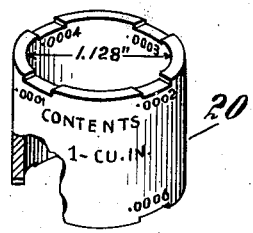
Figure 6 is a perspective view of a cylindrical shaped embodiment to be used in place of the square shaped embodiment shown in Figure 1.

The can or container upon which the label shown in Figure 8 appears, may be made in the form of the embodiment of Figure 1, or of Figure 6, or, the embodiments of Figures 1 and 6 may be made separately as testing members. In Figure 1 is shown a container of cubical form having as an example a volume of 1 cubic inch. Upon the top and bottom the edges are provided with cutout portions of a certain length and depth. The shallowest cutout is marked .0001, the next is .0002, the next .0003, and the deepest cutout is marked .0004. The opposed bottom surface at its edges is marked from the shallowest .0005 to the next .0006, and those not visible are .0007 and the deepest .0008.

Figure 2:
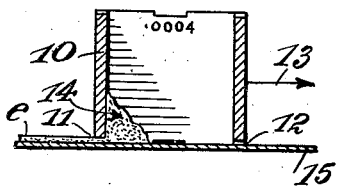
Figure 2 is a vertical section taken on line 2—2 of Figure 1.

When it is desired to test the ink then, a lump, it being of putty-like consistency, is placed adjacent one of the cutouts and the test device is moved. In Figure 2, the test device 10 of the form shown in Figure 1, has the cutout 11 of .0005 depth which will give an area coverage of 80,000 square inches as stated in e of Figure 8. The opposed cutout 12 is of .0007 in. depth and if moved opposite to arrow 13 it will give a coverage of 57,143 square inches as shown by g in Figure 8. When the test cube is moved in the direction of the arrow 13, the ink or paint lump 14 placed immediately in front of the cutout 11, is applied to the paper strip 15, to a depth corresponding to the example "e" in Figure 3. Thereby, the depth of ink determines the shade of color. If satisfactory to the eye, reference is made to the collocation shown in Figure 8, to ascertain the hours to dry, namely, 22 hours to dry. Or reference can be made to the colors in Figure 8 where it is seen that this depth will cover an area of 80,000 in square inches, with 40 cu. in. contents, or 10 lbs. of paint or ink.

Figure 4:
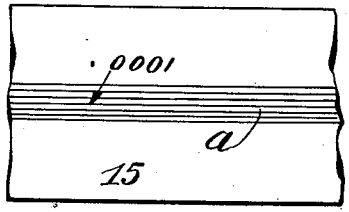
Figure 4 is a plan view of the first gauge of ink shown in Figure 3.
Figure 5:
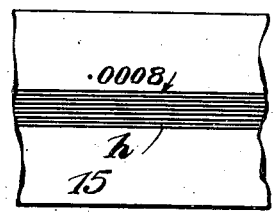
Figure 5 is a plan view of the last gauge of ink shown in Figure 3.

In the use of the test cube 10 at .0005 it will be noted that the test is made in the direction of the arrow 13, and no ink or paint being applied to the cutout 12, there is no conflict or overlapping or interference. The operation is the same with the cutouts "a" to "h" of Figure 3. In Figure 4 a test "a" is shown, and in Figure 5 a test "h". Should it be desired to use the test cube 10 for tests in depths beyond .0008 in. or the "h" test of Figure 3, "i" of the .0009 in. test, or "j" of the .001 in. test of Figure 8, then the vertical edges of the test cube 10 can be also provided with cutouts.

In the embodiment shown in Figure 6, the peripheries of the top and bottom of the cylindrical test mentor, are provided with cutouts, in the top with cutouts of .0001, .0002, .0003 and .0004 inches in depth, and in the bottom wall with cutouts .0006 in., .0005 in., .0007 in. and .0008 in., the latter three not being shown in Figure 6. The operation is the same as that described in connection with Figure 2. Here again, a container of any size can be provided with the cutouts as shown in the test cube 10 of Figure 1, or in the cylindrical test member 20 of Figure 6.

In Figure 7 is shown a simple form of test device. Two superposed rollers 30 and 31, geared together by gears 32 and 33, are suitably supported on standards 34 and 35. The shaft of the upper roller 30 has secured thereto a wheel 36 with a handle 36a, which is rotated in the direction of the arrow 37. The upper roller 30 has a plurality of circumferential cutouts, 38 of .0003, 39 of .0004, and 40 of .0005 inch depth. More or less can be provided, more in the manner of Figure 8 from "a" to "j". A sheet of paper 41 is placed between the two rollers 30 and 31, moving in the direction of arrows 43, 44, the paper moving in the direction of arrow 45. A lump of ink or paint 42 is placed upon the roller 30 at the .0004 in. depth, and the handle 36a moves the wheel 36, gears 32, 33, and rollers 30 and 31. Thereupon, a band or strip of ink or paint, corresponding to "d" in Figure 3 is produced upon the paper 41. From this the shade and other desiderata of the collocations shown in Figure 8 can be determined.

From the foregoing it has been seen that means have been provided to enable tests of ink in regards to film thickness, area in square inch coverage, time of drying, and the shade of the color to be quickly made, and a container of definite cubical contents can be readily analyzed to determine these characteristic indicia. Thus, a container of definite cubical contents as 40 cu. in. will have a coverage area in sq. in. as indicated in Figure 8, will have the drying time, and will have the depth colortone visible of each thickness of film.

I have described various embodiments of my invention, but changes may be made therein without departing from the spirit of the invention as defined in the accompanying claims.

I claim:

1. The method of testing ink requirements which consists in repeatedly applying to a sheet of paper intended to be used in a printing job, ink of varying and increasing film thicknesses, selecting that film thickness test best adapted for its printing characteristics including hours to dry, matching said selected test with one of a series of film thicknesses disposed on a label each indicated with hours to dry and with a film thickness measurement and correlated data indicating for the several film thicknesses the coverage in area of square inches of said ink on said paper.

2. A device for the measurement of color tones of inks, which consists in a testing device having a hollow container for the ink to be tested and provided with a plurality of cutouts or slots at its perimeter, said slots having differently sized depths, the size of each such opening being definitely gauged as a measuring means for allowing a desired quantity of ink to pass therethrough from the inside to the outside of the container by a relative movement in one direction of the testing device across a testing surface placed in juxtaposition therewith to form a certain thickness of ink film and a certain color tone shade on said testing surface, and in another direction of movement to form a different thickness of ink film and a different color shade tone on said testing surface, each indicative of a predetermined drying time, from which the area of coverage in square inches of a definite cubical content may be determined.

FRED W. HOCH.